April 14, 1959　　　E. W. GORTER ET AL　　　2,882,236
METHOD OF MANUFACTURING MAGNET CORES HAVING A SUBSTANTIALLY
RECTANGULAR OUTLINE OF HYSTERESIS LOOP
Filed Jan. 10, 1955

INVENTORS
EVERT WILLEM GORTER
CORNELIS JACOBUS ESVELDT
HENDRIK VAN DER HEIDE
BY

AGENT

United States Patent Office 2,882,236
Patented Apr. 14, 1959

2,882,236

METHOD OF MANUFACTURING MAGNET CORES HAVING A SUBSTANTIALLY RECTANGULAR OUTLINE OF HYSTERESIS LOOP

Evert Willem Gorter, Cornelis Jacobus Esveldt, and Hendrik van der Heide, Emmasingel, Eindhoven, Netherlands, assignors, by mesne assignments, to North American Philips Company, Inc., New York, N.Y., a corporation of Delaware Application January 10, 1955, Serial No. 480,907

Claims priority, application Netherlands January 12, 1954

4 Claims. (Cl. 252—62.5)

Magnet cores having a substantially rectangular outline of hysteresis loop are important for several uses. This kind of core is used inter alia for so-called "magnetic memories" (cf., for example W. N. Papian, Proceedings of the I.R.E., April 1952, pages 475–478, and D. R. Brown and E. Albers-Schoenberg, "Electronics," April 1953, pages 146–149). Such magnetic memories are used inter alia in calculating machines and for automatic pilots. Said cores are also used in magnetic switches.

The extent, to which the outline of the hysteresis loop approaches a rectangle, may be expressed quantitatively in different ways. A usual measure is, for example, the quotient $$\frac{B_r}{B_{cl}}$$

Figure 1:
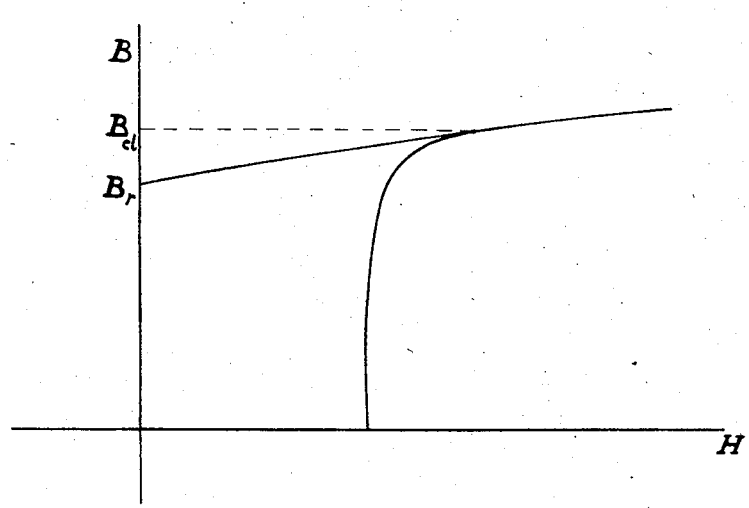

In order to explain the significance of the said quotient, reference is made to Fig. 1 showing part of a saturation magnetisation curve. In this figure, $B_r$ represents the residual inductance, whereas $B_{cl}$ represents that inductance, at which the hysteresis loop just closes itself. In practice it is in many cases no simple task to measure $B_{cl}$ with high accuracy. However, an approximately exact value of $B_{cl}$ is readily found on the basis of the mean value of the inductances after partial magnetisation and partial demagnetisation (with intermediate saturation), both inductances measured at the same field strength, which is so chosen that the said inductances relatively differ more than 1%, but less than 3%. This procedure was followed in the measurements which have led to the present invention; for these measurements use was made of a ballistic galvanometer (see Bozorth, "Ferromagnetism," page 843). Whenever reference is made to the quotient $$\frac{B_r}{B_{cl}}$$

this is assumed to be measured on an annular magnet core of constant cross-section of the ferromagnetic material throughout the circumference of the ring and with an outer diameter at the most 1.6 times the inner diameter.

Figure 2:
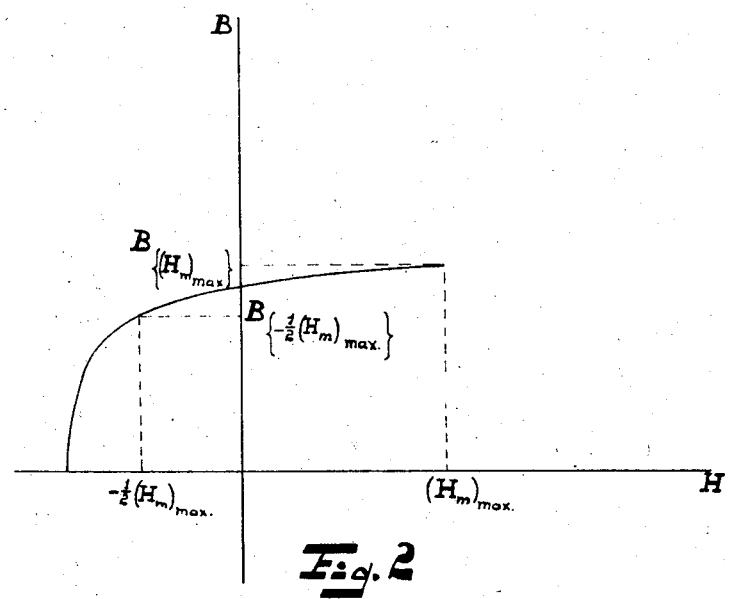

The extent, to which the outline of the hysteresis loop approaches a rectangle, may also be expressed by means of the so-called "squareness ratio" $(R_s)_{max}$. For the significance of this magnitude, reference is made to the literature mentioned before. For the sake of completeness, a short explanation follows hereinafter with reference to Fig. 2, which also shows diagrammatically part of a magnetisation curve relating to a case in which the demagnetisation was started before the magnetic saturation was reached. The magnitude $(R_s)_{max}$ is defined as:

$$\left\{\frac{B_{(-\frac{1}{2}H_m)}}{B_{(H_m)}}\right\}_{max}$$

The quotient $$\frac{B_{(-1/2H_m)}}{B_{(H_m)}}$$

is a function of the maximum field strength $H_m$ applied. This quotient is found to be a maximum for a given value of $H_m$ which in most cases slightly differs from the coercivity $H_c$. Said maximum value of the quotient is indicated by the symbol $(R_s)_{max}$. The measurements of $B_{(H_m)}$ and $B_{(-\frac{1}{2}H_m)}$ required for determining $(R_s)_{max}$ may, as before, be carried out with the use of a ballistic galvanometer. As before, the measuring objects are constituted by annular magnet cores of constant cross-section of the magnetic material throughout the circumference of the ring and with an outer diameter at the most 1.6 times the inner diameter. When using ferromagnetic materials having a substantially rectangular outline of the hysteresis loop in most cases alternating currents of high frequency are concerned, so that it is necessary for eddy currents to be restricted as far as possible. When using ferromagnetic alloys, this may be effected to a certain extent by building up the magnet core from relatively insulated layers of ferromagnetic material which are very thin. However, it is often extremely difficult to assemble such thin layers into cores having a substantially rectangular outline of the hysteresis loop. For such high frequencies it is thus advantageous, and for higher frequencies even necessary, to utilise magnetically soft ferric-oxide-containing materials of spinel structure, since such materials in themselves have a very low electrical conductivity.

For the serviceability of such a magnet core for magnetic memories and magnetic switches it is furthermore essential that the coercivity $(H_c)$ shall be low (preferably not higher than 10 oersteds and preferably even lower than 5 oersteds), since otherwise the electromagnetic loss is unduly high.

According to the invention, it has been found that magnet cores having a substantially rectangular outline of hysteresis loop such that the condition $$\frac{B_r}{B_{cl}}>0.7$$

and/or $(R_s)_{max}>0.6$ while $H_c<4$ oersteds is fulfilled, may be manufactured of a material consisting at least substantially of one or more compounds of the formula $Co_xMn_{(1-x+y)}Fe_2O_4$, in which $x=0.01$–$0.04$ and $y\leq0.3$, which compound or compounds is or are manufactured by heating a mixture consisting of cobalt, manganese and iron compounds in the desired ratio of weight up to a temperature of from 1400° to 1500° C. In the manufacture of compounds containing a comparatively large amount of manganese, the heating process may also be effected in technical nitrogen instead of in air or in oxygen. In the manufacture of compounds containing a smaller amount of manganese, heating in atmospheric air or in oxygen is preferable. Within the scope of the invention it is even possible to manufacture magnet cores having a coercivity smaller than 1 oersted, as appears from the example following hereinafter. Such magnet cores are naturally very valuable.

Example

A mixture consisting of cobalt carbonate, $CoCO_3$, manganese carbonate, $MnCO_3$ and ferric oxide, $Fe_2O_3$, is ground in alcohol for 5 hours and subsequently preheated in air at 900° C. for one hour. After cooling, the reaction product is ground in alcohol for another two hours, whereafter the ground product is pressed to form a ring. The ring is heated in oxygen at about 1450° C. for two hours.

Annular cores of different composition are manufactured by varying the ratio of the amounts of cobalt carbonate and manganese carbonate in the initial material. The composition, the value of the quotient $$\frac{B_r}{B_{cl}}$$

that of $(R_s)_{max}$ and that of $H_c$ are specified for some of these magnet cores in the table below.

| Composition | $\frac{B_r}{B_{cs}}$ | $(R_s)_{max}$ | $H_c$ (in oersteds) |
|---|---|---|---|
| $Co_{0.01}Mn_{0.99}Fe_2O_4$ | 0.75 | 0.70 | 0.45 |
| $Co_{0.02}Mn_{0.98}$ | 0.75 | 0.70 | 0.45 |
| $Co_{0.02}Mn_{1.08}$ | 0.65 | 0.65 | 0.45 |
| $Co_{0.02}Mn_{1.28}$ | 0.65 | 0.65 | 0.45 |

What is claimed is:

1. A ferromagnetic ferrite having a substantially square hysteresis loop formed by firing at a temperature of about 1400 to 1500° C. a mixture of cobalt, manganese, and ferric oxides in proportions forming a composition having the formula:

$$Co_xMn_{(1-x+y)}Fe_2O_4$$

in which $x=0.01-0.04$ and $y$ is less than 0.3, said ferrite having a coercive force less than 4 oersteds and at least one of the following characteristics: $B_r/B_{cl}$ greater than 0.7, $(R_s)_{max}$ greater than 0.6.

2. A method of making a ferromagnetic ferrite having a substantially square hysteresis loop comprising the steps, forming a finely-divided mixture of cobalt oxide, manganese oxide and ferric oxide in proportions corresponding to a composition having the formula:

$$Co_xMn_{(1-x+y)}Fe_2O_4$$

in which $x=0.01-0.04$ and $y$ is less than 0.3, and firing said mixture at a temperature of about 1400 to 1500° C. in a non-reducing atmosphere to form said composition, said ferrite having a coercive force of at least 4 oersteds and at least one of the following characteristics: $B_r/B_{cl}$ greater than 0.7, $(R_s)_{max}$ greater than 0.6.

3. A method as claimed in claim 2 in which the atmosphere is air.

4. A method as claimed in claim 2 in which the atmosphere is oxygen.

References Cited in the file of this patent

UNITED STATES PATENTS

| | | |
|---|---|---|
| 2,626,445 | Albers-Schoenberg | Jan. 27, 1953 |
| 2,715,109 | Albers-Schoenberg | Aug. 9, 1955 |

FOREIGN PATENTS

| | | |
|---|---|---|
| 697,219 | Great Britain | Sept. 16, 1953 |

OTHER REFERENCES

Physica III, No. 16, June 1936, pages 468 to 473.